United States Patent [19]

Barnard et al.

[11] Patent Number: 5,553,822

[45] Date of Patent: Sep. 10, 1996

[54] SUPPORT MEANS FOR CONDUIT

[75] Inventors: Michael A. Barnard; Marvin L. Cox, both of Wichita, Kans.

[73] Assignee: Wescon Products Company, Wichita, Kans.

[21] Appl. No.: 372,389

[22] Filed: Jan. 13, 1995

[51] Int. Cl.$^6$ ........................................................ F16L 3/08
[52] U.S. Cl. ........................... 248/302; 248/73; 74/502.4; 74/502.6; 403/392
[58] Field of Search ........................... 24/67.9, 332, 343, 24/563; 74/502.4, 502.6; 248/51, 52, 222.12, 231.9, 316.1, 69, 73, 302, 500; 403/229, 291, 384, 392, 395, 397

[56] References Cited

U.S. PATENT DOCUMENTS

| 666,735 | 1/1901 | Capewell | 24/707.4 |
|---|---|---|---|
| 953,951 | 4/1910 | Hubbard | 248/302 X |
| 1,511,334 | 10/1924 | Havemeyer | 51/649.5 |
| 2,224,972 | 12/1940 | Long, Jr. et al. | 24/343 X |
| 2,419,317 | 4/1947 | Hall | 248/73 |
| 2,806,668 | 9/1957 | Hewes | 403/229 X |
| 2,852,797 | 9/1958 | Dawbenspeck | 403/229 X |
| 2,891,792 | 6/1959 | Thoeming | 403/229 X |
| 2,981,513 | 4/1961 | Brown | 248/222.12 X |
| 3,298,074 | 1/1967 | Kedem | 403/376 |
| 4,127,921 | 12/1978 | Townsend | 24/27 |
| 4,270,737 | 6/1981 | Binns et al. | 256/32 X |
| 5,217,438 | 6/1993 | Davis et al. | 403/229 X |

FOREIGN PATENT DOCUMENTS

| 485462 | 4/1937 | United Kingdom | 248/73 |
|---|---|---|---|
| 559192 | 2/1944 | United Kingdom | 24/332 |

*Primary Examiner*—Anthony Knight
*Assistant Examiner*—Andrea Chop
*Attorney, Agent, or Firm*—Hovey, Williams, Timmons & Collins

[57] ABSTRACT

An attachment apparatus is provided for attaching an elongated shaft to a structural element, wherein the shaft defines a longitudinal axis, and the structural element includes an opening through the structural element which defines a central axis extending in a direction generally perpendicular to the axis of the shaft. The apparatus includes a helical coil of wire having a central coiled section and opposed end sections protruding from the coiled section, an inner space defined by the coiled section that is sized to grip the shaft and to prevent relative axial movement between the helical coil and the shaft when the coil is mounted on the shaft, and a fastening assembly for fastening the apparatus to the structural element when at least one end section is inserted into the opening. The apparatus is mounted on the elongated shaft by rotating the opposed end sections so that the coiled section unwinds, increasing the diameter of the inner space to a point where it is slightly larger than the cross-sectional diameter of the shaft. The elongated shaft is inserted through the inner space to a desired position relative to the apparatus, and the opposed end sections are rotated so that the coiled section rewinds, decreasing the diameter of the inner space until the shaft is firmly retained through the apparatus. In a preferred embodiment, the fastening assembly includes hook-shaped tips defined by the opposed end sections, and spaced-apart by a distance greater than the diameter of the opening.

1 Claim, 1 Drawing Sheet

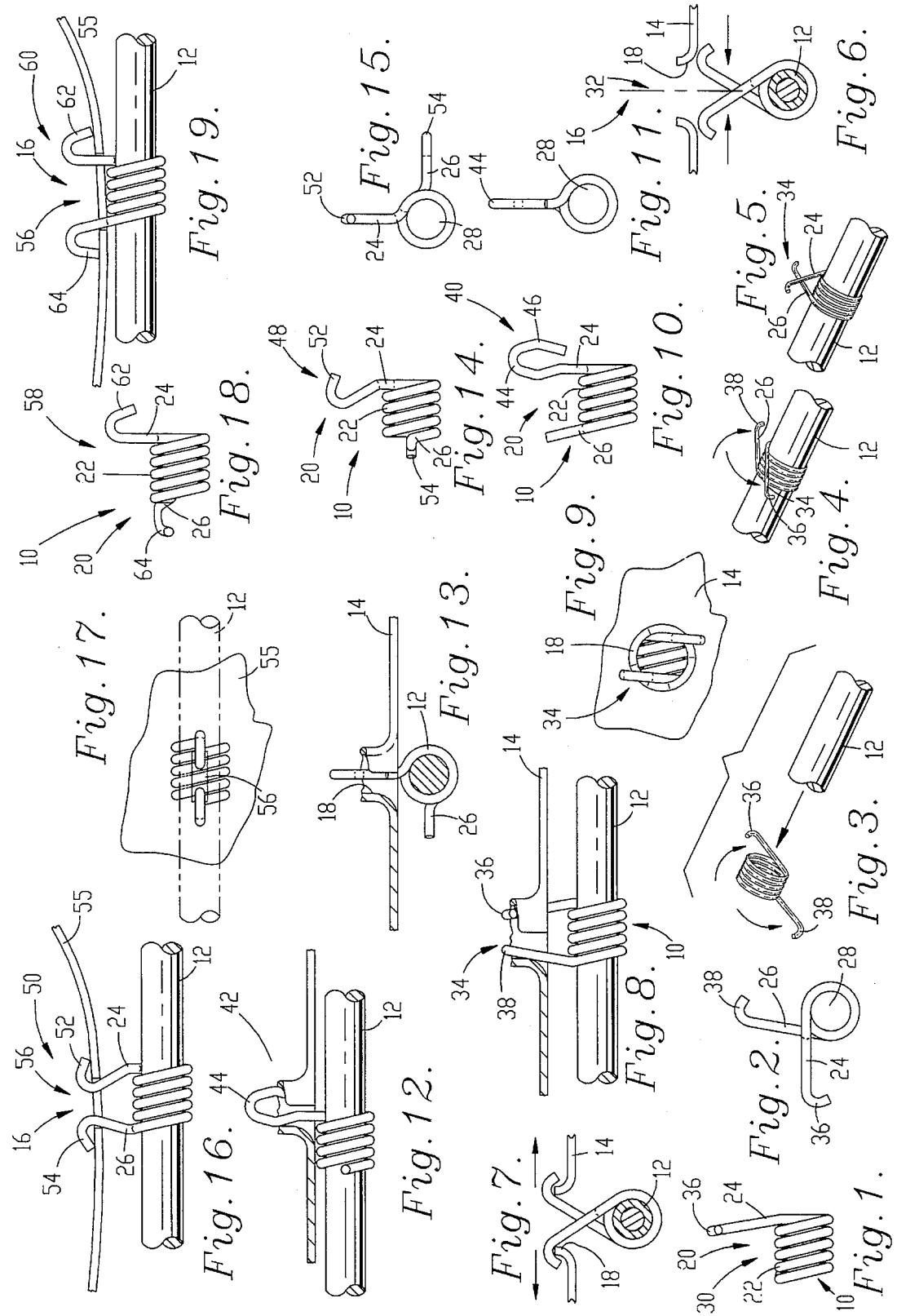

SUPPORT MEANS FOR CONDUIT

BACKGROUND OF THE INVENTION

1. Field of the Invention

The present invention relates generally to fasteners, and, more particularly, to an attachment apparatus for attaching an elongated member alongside a structural element having an opening formed therein.

2. Discussion of the Prior Art

Presently, in the construction of a walk-behind lawn mower for trimming grass, a lawn mower deck is provided which supports a controllable engine, and at least one grass cutting blade. Such lawn mowers include a handle bar allowing an operator to position the lawn mower over the grass to be trimmed. Remote engine controls are commonly placed on the handle bar so that they may be reached quickly. The linkage between the engine control and the remote control is often a mechanical linkage, such as a cable. Since cables have a tendency to buckle when placed under relatively high longitudinal compressive forces, such as those necessary to manipulate the engine controls, the cables are often placed in a conduit, sheath, or other elongated hollow shaft, sufficiently rigid to prevent such buckling. A typical conduit is constructed of a synthetic resin material, such as Polyvinyl Chloride (PVC), which provides sufficient rigidity.

A conduit provides the additional benefit of protecting the cable from corrosive environmental effects. However, due to the frictional forces exerted on the cable by the interior of the conduit, the conduit must be secured to the lawn mower so that the remote control may effectively push and pull the cable through the conduit.

It is known to provide a metallic clamp-type device which may be fastened to a shroud extending around the engine, effectively clamping and securing the conduit to the shroud while allowing the cable to be pushed and pulled within the conduit. Clamp-type devices are commonly secured to the shroud by means of a self-tapping screw, requiring an opening defined in the structural element which has a sufficient depth, or side wall, that provides a surface for the screw to tap itself upon. Extruded holes, holes which have been stamped or punched through a relatively flat element, turning the edges of the element inward, provide an opening with sufficient depth for self-tapping screws.

In assembly, clamp-type devices require that the conduit be positioned in the clamping area of the device, and retained, usually by hand, while the device is fastened to the structural element. If the conduit is positioned incorrectly, the remote engine control will not be allowed to move through its full range of motion, reducing its effectiveness in controlling the engine. Therefore, it is important to correctly position the conduit with respect to the engine. Because such clamp-type devices require that the assembler use one hand to position the conduit, and the other hand to secure the device, assembly becomes a difficult and time-consuming process, increasing production time, and labor costs associated with producing a lawn mower.

It is also known to provide a strap fastener constructed of a flexible synthetic resin material which may be used to secure the conduit to the structural element. Plastic strap fasteners, which resemble those used with trash bags, are relatively inexpensive to produce, but are generally not reusable. In addition, they are limited to use with tubular or cylindrical structural elements, such as the handle bar on the lawn mower, and cannot be used to secure conduits and the like to relatively large flat surfaces, such as the engine shroud. Additionally, plastic strap fasteners cannot be used around heated areas because they may melt, or otherwise rapidly lose structural integrity.

It is further known to provide a snap-on axial end fitting for a conduit which may be used to attach the end of the conduit perpendicular to the surface of the shroud. These fittings are commonly made of a synthetic resin material, and provide at least one flexible barb, allowing the fitting to be pushed into a receiving aperture, securing the fitting to the structural element once the barb has been pushed through the aperture.

Such an end fitting allows the conduit to be quickly positioned and secured to the element. However, because such fittings must be placed on the axial end of the conduit, the distance between the shroud and the end of the cable protruding from the conduit must be relatively small so that buckling of the exposed portion of the cable does not occur. Additionally, these fittings require a special aperture in the shroud, one which has a relatively shallow depth and a specific shape so that the barb may be allowed to effectively retain the conduit on the shroud.

SUMMARY OF THE INVENTION

It is an object of the present invention to provide an apparatus for attaching a sleeve, conduit or other elongated shaft alongside a structural element at an opening formed in the structural element so that the shaft is secured to the element.

It is another object of the present invention to provide an attachment apparatus that permits an elongated hollow shaft to be attached to a structural element while protruding past the apparatus to protect the entire length of the cable supported within the shaft from buckling.

It is a further object of the present invention to provide an apparatus for attaching an elongated shaft to a structural element having any shape of surfaces, such as relatively flat surfaces, or relatively curved surfaces. It is yet another object of the present invention to provide an apparatus which may be fastened to a structural element with relative quickness. Yet a further object of the present invention is to provide an apparatus which may be fastened to a structural element adapted for use with a prior art fastening device.

In accordance with the present invention, an attachment apparatus is provided for attaching an elongated shaft to a structural element, wherein the shaft defines a longitudinal axis, and the structural element includes an opening through the structural element which defines a central axis extending in a direction generally perpendicular to the axis of the shaft.

The apparatus includes a helical coil of wire having a central coiled section and opposed end sections protruding from the coiled section, an inner space defined by the coiled section that is sized to grip the shaft and to prevent relative axial movement between the helical coil and the shaft when the coil is mounted on the shaft, and a fastening assembly for fastening the apparatus to the structural element when at least one end section is inserted into the opening.

The apparatus is mounted on the elongated shaft by rotating the opposed end sections so that the coiled section unwinds. Unwinding the coiled section causes the diameter of the inner space to increase. The diameter of the inner space is increased to a point where it is slightly larger than the cross-sectional diameter of the shaft.

The elongated shaft is inserted through the inner space to a desired position relative to the apparatus. Once the desired position is achieved, the opposed end sections are rotated so that the coiled section rewinds, decreasing the diameter of the inner space. The coiled section is rewound until the diameter of the inner space is slightly smaller than the cross-sectional diameter of the shaft, causing the coiled section to create impressions on the surface of the shaft, and allowing the apparatus to be firmly seated upon the shaft. The opposed end sections are then rotated to a desired radial position with respect to the coiled section.

In a preferred embodiment, the fastening assembly is adapted for use with a relatively circular opening. The assembly includes hook-shaped tips defined by the opposed end sections, and spaced-apart by a distance greater than the diameter of the opening. The tips extend in a direction tangential to the coiled section and intersect a plane defined by the longitudinal axis of the shaft and the central axis of the opening. As the apparatus is fastened to the structural element and the tips of the two end sections are pushed into the opening in the structural element, the tips are deflected toward one another and the coiled section is forced to partially unwind until the tips are pushed completely through the opening, allowing the coiled section to rewind.

BRIEF DESCRIPTION OF THE DRAWING FIGURES

Preferred embodiments of an apparatus for attaching an elongated shaft to a structural element is described in detail below with reference to the drawing figures, wherein:

FIG. 1 is a side elevational view of an attachment apparatus constructed in accordance with a first embodiment of the present invention, depicting the apparatus in a condition prior to mounting on an elongated shaft;

FIG. 2 is an end elevational view of the attachment apparatus of FIG. 1;

FIG. 3 is a perspective view of the apparatus of FIG. 1, depicting an elongated shaft being inserted through the apparatus;

FIG. 4 is a perspective view of the apparatus of FIG. 1, depicting the apparatus during mounting on the shaft;

FIG. 5 is a perspective view of the apparatus of FIG. 1, depicting the apparatus after being mounted on the shaft;

FIG. 6 is an end elevational view of the apparatus of FIG. 1, depicting the hook-shaped tips of the apparatus being inserted into an opening of a structural element;

FIG. 7 is an end elevational view of the apparatus of FIG. 1, depicting the apparatus fastened to the structural element;

FIG. 8 is a side elevational view of the assembly shown in FIG. 7;

FIG. 9 is a top plan view of the assembly shown in FIG. 7;

FIG. 10 is a side elevational view of an attachment apparatus constructed in accordance with a second embodiment of the present invention, depicting the apparatus in a condition prior to mounting the apparatus on an elongated shaft;

FIG. 11 is an end elevational view of the attachment apparatus of FIG. 10;

FIG. 12 is a side elevational view of the apparatus of FIG. 10, depicting the apparatus mounted on an elongated shaft and fastened to a structural element;

FIG. 13 is an end elevational view of the assembly shown in FIG. 12;

FIG. 14 is a side elevational view of an attachment apparatus constructed in accordance with a third embodiment of the present invention, depicting the apparatus in a condition prior to mounting the apparatus on an elongated shaft;

FIG. 15 is an end elevational view of the attachment apparatus of FIG. 14.

FIG. 16 is a side elevational view of the apparatus of FIG. 14, depicting the apparatus mounted on an elongated shaft and fastened to a structural element;

FIG. 17 is a top plan view of the assembly shown in FIG. 16;

FIG. 18 is a side elevational view of the attachment apparatus of FIG. 14, depicting another embodiment of the hook-shaped ends; and FIG. 19 is a side elevational view of the apparatus of FIG. 18, depicting the apparatus mounted on an elongated shaft and fastened to a structural element.

DETAILED DESCRIPTION OF THE PREFERRED EMBODIMENTS

Preferred embodiments of an attachment apparatus for attaching an elongated shaft to a structural element are illustrated in the drawing figures. As shown in FIG. 8, the elongated shaft 12 defines a longitudinal axis, and the structural element 14 includes an opening 16 defined therein, extending through the structural element 14 in a direction generally perpendicular to the surface of the element 14.

The shaft 12 has a relatively tubular construction, such as a conduit, with an interior space adapted for carrying a control linkage, such as a cable, as shown in FIG. 7. The control linkage connects a remote engine control with an engine, such as a lawn mower engine, allowing an operator to control the condition of the engine by manipulating the remote control. The frictional forces which result from pushing and pulling the cable through the shaft 12 require that the shaft 12 be rigidly attached to the structural element 14.

As shown in FIG. 8, the structural element 14 presents a relatively flat surface, such as that presented by an engine shroud commonly found on a lawn mower. Alternatively, the structural element may present a relatively rounded surface, so long as an opening is provided in the element within which the apparatus may be received.

As shown, for example, in FIG. 5, the attachment apparatus is configured to attach the elongated shaft to the structural element 14 and includes a helical coil of wire 20 having a central coiled section 22 and opposed end sections 24, 26 protruding from the coiled section 22. An inner space 28 is defined by the coiled section 22 and is sized to grip the elongated shaft 12 and to prevent relative axial movement between the helical coil 20 and the shaft 12 when the coil 20 is mounted on the shaft 12. A fastening means is defined by at least one of the end sections for fastening the apparatus to the structural element 14.

There exist several embodiments of the attachment apparatus 10. With reference to FIGS. 1–9, a first embodiment 30 is fastenable to the structural element 14 which has a relatively circular opening 32, and includes a fastening means 34 having the opposed end sections 24, 26 presenting hook-shaped tips 36, 38 spaced apart by a distance greater than the diameter of the circular opening 32. The opposed end sections 24, 26 of the coil 20 extend in a direction generally tangent to the coiled section 22. As shown in FIG. 6, when the first embodiment 30 is fastened to the structural element 14 having the circular opening 32, the tips 36, 38 intersect a plane defined by the longitudinal axis of the shaft 12 and the axis of the opening 32 in the structural element 14.

The first embodiment 30 is mounted on the elongated shaft 12 in a two step process. First, as depicted in FIG. 3, the opposed end sections 24, 26 are rotated in a first direction so that the coiled section 22 unwinds, thereby increasing the diameter of the inner space 28 to a point where the diameter of the inner space 28 is slightly larger than the cross-sectional diameter of the shaft 12. The elongated shaft 12 is then inserted through the inner space 28 to a desired position relative to the first embodiment 30 of the apparatus The second step is depicted in FIG. 4. Once the shaft 12 is placed in the desired position, the opposed end sections 24, 26 are rotated in a second direction to predetermined positions relative to each other so that the coiled section 22 is rewound, decreasing the diameter of the inner space 28. Rotating the opposed end sections 26 to the predetermined positions decreases the diameter of the inner space 28 so that it is slightly smaller than the cross-sectional diameter of the shaft 12. This causes the coiled section 22 to create impressions on the surface of the shaft 12, allowing the first embodiment 30 to be permanently and firmly seated upon the shaft Once the rotational force exerted on the opposed end sections 24, 26 is removed, they take desired radial positions with respect to the coiled section 22, as depicted in FIG. 5. The other embodiments of the attachment apparatus 10 are mounted on the shaft 12 in substantially the same manner, therefore, the method of mounting the attachment apparatus 10 will not be discussed further.

The ability to firmly mount the attachment apparatus 10 on the shaft 12 in a desired relationship relative to each other allows the shaft 12 to be accurately positioned on the lawn mower more quickly than the prior art fasteners. The ability to mount the apparatus 10 on the shaft 12 while having the shaft 12 extend through the apparatus 10 yields an accurate quick-mounting apparatus that may be used where the distance between the structural element 14 and the lawn mower engine is relatively large, thereby, preventing undesired buckling of the control cable.

Each turn of the coiled section 22 represents an active coil. The number of active coils in the coiled section 22 is directly proportional to the firmness and rigidity with which the attachment apparatus be may be mounted on the shaft 12. Increasing the number of active coils also increases the amount the end sections 24, 26 must be rotated to enlarge the diameter of the inner space 28 so that the shaft 12 may be inserted, thereby, increasing the difficulty of mounting the attachment apparatus 10 on the shaft 12.

A coiled section presenting between three and seven active coils provides a satisfactory balance of this need for firmness, and ease of mounting. Each of the embodiments of the attachment apparatus 10 use substantially the same number of active coils, therefore, the number of active coils will not be discussed further.

The diameter and material of the wire of the helical coil 20 is also an important aspect of the preferred attachment apparatus 10. For instance, as the diameter of the wire is increased, the elasticity of the wire is decreased, and as the diameter of the wire is decreased, the strength of the wire is decreased. Due to the need for rotating the end sections 24, 26 to mount the attachment apparatus 10 on the shaft 12, the wire must be able to withstand the rotating while being sufficiently strong to attach the shaft 12 to the structural element 14 and withstand the vibrational forces exerted by the engine and longitudinal forces exerted by pushing and pulling the cable through the shaft 12.

Music or piano wire having a diameter of between approximately 0.762 mm (0.03 inches) and 1.27 mm (0.05 inches) is suitable in providing a sufficiently elastic and yet strong wire from which to make the helical coil 20. Each of the embodiments of the attachment apparatus 10 use wire having substantially the same diameter, therefore, the size of the wire diameter will not be discussed further.

Since the attachment apparatus 10 will be exposed to nature's elements, the wire must also be corrosion resistant. Zinc plating the piano wire through hydrogen imbrittlement, or black chromate plating the wire provides a wire that is sufficiently corrosion resistant. These processes do not substantially affect the elasticity nor the strength of the wire. Each of the embodiments of the attachment apparatus 10 use wire which is corrosion resistant, therefore, the corrosion resistance of the wire will not be discussed further.

The first embodiment 30 is fastened to the structural element 14 having the circular opening 32 by inserting the tips 36, 38 through the circular opening 32. The tips 36, 38 are oriented so that as they are pushed through the circular opening 32, they are deflected toward one another in a direction forcing the coiled section 22 to unwind. The coiled section 22 rewinds once the tips 36, 38 are pushed fully through the circular opening Such an orientation of the tips 36, 38 is important. If they were oriented so that the tips 36, 38 were deflected in a direction causing the coiled section 22 to wind tighter around the elongated shaft 12, too much force would be required to push the tips 36, 38 into the opening 32. Additionally, the tips 36, 38 would not fully return to their previous position relative to each other. This would yield the undesired result of having an apparatus which could not be easily inserted into an opening, but could possibly be pulled out of the opening, thereby not effectively attaching the shaft 12 to the structural element 14.

A second embodiment 40 of the attachment apparatus 10 is depicted in FIGS. 10–13. The second embodiment 40 is also fastenable to the structural element 14 having the circular opening 32. However, the second embodiment 40 includes a fastening means 42 having the end section 24 of coil 20 presented as an inverted U-shaped snap-hook 44 with a bowed-edge 46 and a width that is greater than the diameter of the circular opening 32. The end section 24 of the coil 20 extends in a direction generally radial to the coiled section 22 within a plane defined by the longitudinal axis of the shaft 12 and the axis of the opening 32 in the structural element 14.

The second embodiment 40 is fastened to the structural element 14 having the circular opening 32 by pushing the snap-hook 44 through the opening 32. As the snap-hook 44 comes into contact with the side walls 18 of the opening 32, the bowed-edge 46 is deflected, thereby compressing the snap-hook 44. Once inside the opening the snap-hook 44 re-expands. The shape of the bowed-edge 46 preferably allows the snap-hook 44 to removably fasten the second embodiment 40 to the structural element 14. However, the snap-hook may be formed in a shape that prevents removal.

A third embodiment 48 of the attachment apparatus 10 is depicted in FIGS. 14–17 and includes a fastening means 50 having the opposed end sections 24, 26 of the helical coil 20 presenting hook-shaped tips 52, 54. When the third embodiment 48 is mounted on the shaft 12, the tips 52, 54 extend in a direction generally radial to the coiled section 22 within a plane intersecting the longitudinal axis of the elongated shaft 12. The tips 52, 54 are spaced apart from each other so that the third embodiment 48 may be fastened to the structural element having the circular opening 32, or, alternatively, it may be fastened to a structural element 55 having an elongated opening 56.

FIGS. 16 and 17 depict the third embodiment 48 fastened to structural element 55 having the elongated opening 56. The third embodiment 48 is fastened to the structural element 55 by inserting the hook-shaped tips 52, 54 into the elongated opening 56, so that as the tips 52, 54 are pushed through the elongated opening 56, they are deflected toward one another in a direction along the longitudinal axis of the elongated shaft FIGS. 18–19 depict a forth embodiment 58 of attachment apparatus 10 which is fastenable to the structural element 55 having the elongated opening 56, and includes a fastening means 60 having the opposed end sections 24, 26 of the helical coil 20 presenting hook-shaped tips 62, 64. When the forth embodiment 58 is mounted on the shaft 12, the tips 62, 64 extend in a direction generally radial to the coiled section 22 within a plane intersecting the longitudinal axis of the elongated shaft 12. The hook-shaped tips 62, 64 are spaced apart from one another by a distance greater than the length of the elongated opening The forth embodiment 58 of apparatus 10 is fastened to the structural element 55 having the elongated opening 56 by inserting the tips 62, 64 into the opening 56. As the tips 62, 64 are pushed through the elongated opening 56, they are deflected toward one another in a direction along the longitudinal axis of the shaft Although the invention has been described in the above preferred embodiment with reference to the illustrated figures, it is understood that substitutions may be made and equivalents employed herein without departing from the scope of the invention as set forth in the claims.

What is claimed is:

1. In combination:

an elongated shaft defining a longitudinal axis;

a structural element including an opening of a predetermined diameter and defining a central axis extending in a direction perpendicular to the longitudinal axis; and a fastening means for fastening the shaft to the structural element, the fastening means including a helical coil of wire including a central coiled section having three to seven coils, and two opposed end sections extending tangentially from the coiled section, the coiled section being sized of a diameter smaller than the shaft to grip the shaft and to prevent relative axial movement between the helical coil and the shaft when the coil is mounted on the shaft, the end sections including hook-shaped tips that are spaced apart from one another by a distance greater than the predetermined diameter of the opening so that the tips, when received in the opening, fasten the elongated shaft to the structural element, the opposed end sections of the coil each intersecting a plane defined by the longitudinal axis of the shaft and the central axis of the opening so that as the tips of the two end sections are pushed through the opening in the structural element, the tips are deflected toward one another and the coiled section is forced to partially unwind until the tips are pushed completely through the opening.

\* \* \* \* \*